United States Patent [19]

Sumiyoshi et al.

[11] Patent Number: 4,720,748

[45] Date of Patent: Jan. 19, 1988

[54] CATHODE RAY TUBE

[75] Inventors: Hiroji Sumiyoshi; Kazuo Omae, both of Shinagawa; Akira Hamanaka, Setagaya; Yuzuru Watanabe, Shinagawa, all of Japan

[73] Assignee: Sony Corporation, Tokyo, Japan

[21] Appl. No.: 726,902

[22] PCT Filed: Aug. 15, 1984

[86] PCT No.: PCT/JP84/00401

§ 371 Date: Apr. 18, 1985

§ 102(e) Date: Apr. 18, 1985

[87] PCT Pub. No.: WO85/01151

PCT Pub. Date: Mar. 14, 1985

[30] Foreign Application Priority Data

Aug. 19, 1983 [JP] Japan ................................ 58-151801

[51] Int. Cl.[4] ................................ H04M 5/65

[52] U.S. Cl. ................................ 358/246; 358/247; 358/248; 313/477 R

[58] Field of Search ................................ 358/246, 248, 247; 220/2.11, 2.3; 313/477 R; 445/8

[56] References Cited

U.S. PATENT DOCUMENTS

| | | | |
|---|---|---|---|
| 3,220,593 | 11/1965 | Powell et al. | 358/246 |
| 3,730,990 | 5/1973 | Miyata et al. | 358/246 |

*Primary Examiner*—Edward L. Coles, Sr.

*Attorney, Agent, or Firm*—Hill, Van Santen, Steadman & Simpson

[57] ABSTRACT

This invention relates to a cathode ray tube which uses a tension band to afford an implosion protection. The cathode ray tube of this invention includes a panal (21) formed of a face portion (4) which is respectively formed as a curved surface and a skirt portion (5). A mold match line (23) of this panel (21) is formed so as to substantially follow the boundary between the face portion (4) and the skirt portion (5) and a tension band (29) for use in implosion protection is wound around this mold match line (23). Accordingly, the tension of the tension band can effectively be transmitted to the entire periphery of the face portion and thus the implosion protection of the panel can be increased.

2 Claims, 10 Drawing Figures

CATHODE RAY TUBE

DESCRIPTION

Technical Field

This invention relates to a cathode ray tube and more particularly relates to improvements of the panel thereof.

BACKGROUND ART

A panel for use in a square type cathode ray tube, for example, a cylindrical panel 1 of FIG. 1 and a spherical panel 2 of FIG. 2 are each formed of face portions 4 which are respectively formed as cylindrical and spherical curved surfaces and skirt portions 5. As shown in FIG. 3, such panel is a molded product that is provided by filling a melted glass 9 into a metal mold formed of a bottom 7 and a shell ring 8 and then pressing the melted glass 9 by a plunger 10. In accordance with the shape of the connected portion between the bottom 7 and the shell ring 8, the molded panel is given with a mold match line 3 which is a ridge line taking the form of gentle convexity. As shown in FIGS. 1 and 2, the mold match line 3 of the prior art panel is a straight line which runs in parallel to an end surface 11 thereof connected with a funnel portion. After this panel is assembled with the funnel portion to thereby construct the cathode ray tube, a tension band 16 is wound around the mold match line 3, whereby to reinforce the implosion protection of the cathode ray tube. The tension by the tension band 16 causes a compression force within the surface of the face portion 4 and produces a stress against the external force. However, when the tension band 16 is wound around the prior art panel, a tension F thereof is concentrated on the mold match line 3 of straight line shape. As a result, as shown in FIG. 5, at the corner portion where the mold match line 3 and the face portion 4 are close to each other, the tension F is transmitted to the face portion 4, while at central regions 12, 14 and 13 of the side portions of the face portion 4 remote from the mold match line 3 with large distances of ha, hb and hc, the tension F is not effectively transmitted to the face portion as shown in FIG. 4 so that the stresses caused by high atmospheric pressure and impact force can not be reduced so much. Particularly, when as shown in FIGS. 1 and 2, the tension band 16 has a uniform width over the entire periphery of the panel and the both upper and lower sides thereof are made in parallel to each other, the above-described problem exists in a standpoint for reinforcing implosion protection of the cathode ray tube.

In view of the above-described aspect, this invention is to provide a cathode ray tube in which the tension by a tension band over a mold match line can effectively be transmitted to the entire periphery of a face portion of a panel so that a resistance of the face portion against an external force can be increased to thereby increase the implosion protection.

DISCLOSURE OF INVENTION

The present invention relates to a cathode ray tube having a panel formed of a face portion which is formed as a curved surface and a skirt portion, wherein a mold match line of the panel is formed so as to be substantially matched with the boundary between the face portion and the skirt portion and in which a tension band for implosion protection is wound around the mold match line.

Further, in the above-described cathode ray tube of this invention, the tension band wound over the mold match line of the panel has the shape so as to be substantially matched with the boundary between the face portion and the skirt portion.

According to the above-described cathode ray tube, the tension by the tension band around the mold match line of the panel can effectively be transmitted to the entire periphery of the face portion, thus increasing the implosion protection of the cathode ray tube.

BEST MODE FOR CARRING OUT THE INVENTION

Figure 1:
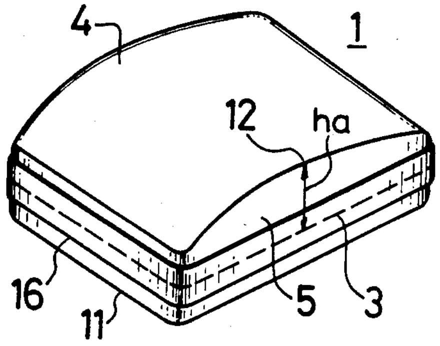
FIG. 1 (PRIOR ART)
FIGS. 1 and 2 are respectively perspective views illustrating the states that prior art tension bands are wound around a prior art cylindrical panel and spherical panel respectively.

According to this invention, over the entire periphery of the panel, the distance between a mold match line and a face portion is decreased as much as possible to thereby transmit the tension by the tension band to the face portion effectively. To this end, when a panel is a cylindrical panel 21 as, for example, shown in FIG. 6, a mold match line 23 is formed so as to substantially follow the boundary between the face portion and the skirt portion. In other words, at the portion corresponding to the curved line of a long side portion 22 of a face portion 4, there is formed a mold match line 23 which follow such curved line, while at the portion corresponding to the straight line of a short side portion 24, there is formed a mold match line 23 of a straight line.

An angle $\theta$ formed between the mold match line 23 and a straight line 28 which is in parallel to a seal surface 11 is properly selected to be as $0° < \theta < 10°$.

To manufacture such panel 21, a connecting surface between the bottom and the shell which form a metal mold is not formed as a straight line as in the prior art but as a curved line corresponding to the curved line of the long side portion 22 of the face portion 4 as seen from the side surface thereof.

Then, a metal tension band 29 is wound around the mold match line 23. As the tension band 29 used in this invention, such one may be used which has the same width on the mold match line 23 over the entire periphery of the panel and the both upper and lower sides thereof parallel to each other.

Figure 7:
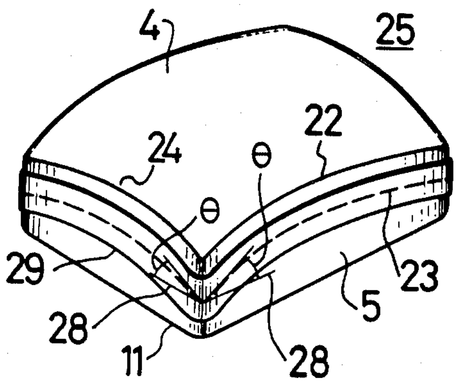
Figure 8:
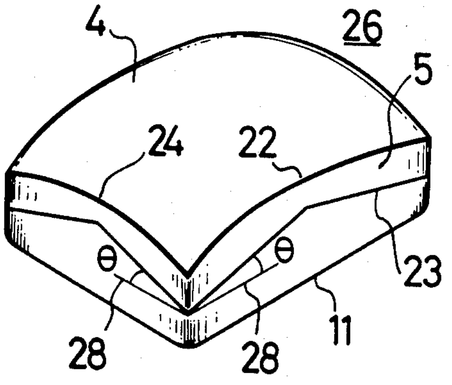
FIGS. 8 and 9 are respectively perspective views illustrating other embodiments of the panel according to this invention.
Figure 9:
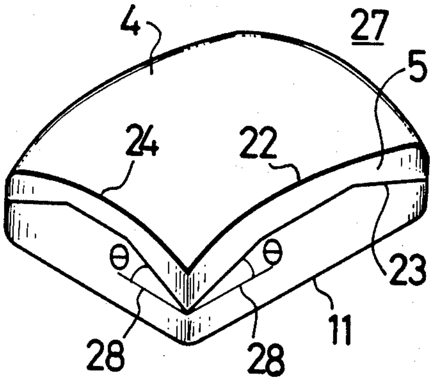

FIGS. 7 to 9 illustrate other embodiments of the panel accordihg to this invention, respectively.

In a spherical panel 25 as shown in FIG. 7, at the portion corresponding to the curved line of the long side portion 22 of the face portion 4, there is formed a mold match line 23 which substantially follows such curved line, while at the portion corresponding to the curved line of the short side portion 24, there is also formed a mold match line 23 which substantially follows such curved line. Then, a tension band 29 having the same width is wound around the mold match line.

In a spherical panel 26 shown in FIG. 8, at the portions corresponding to the curved lines of the long side portion 22 and the short side portion 24 of the face portion 4, there are formed mold match lines 23 by two straight lines which substantially follow such curved lines. That is, the mold match lines 23 in this case are equivalent to both oblique sides of equilateral triangles whose vertexes are placed at the positions same as the centers of the side portions 22 and 24.

In a spherical panel 27 shown in FIG. 9, at the portions corresponding to the curved lines of the long side portion 22 and the short side portion 24 of the face portion 4, there are respectively formed mold match lines 23 by three straight lines which substantially follow such curved lines. In other words, the mold match lines 23 in this case are equivalent to the shape of an isosceles trapezoid with the bottom sides removed which substantially follow the curved lines of the side portions 22 and 24.

Figure 5:
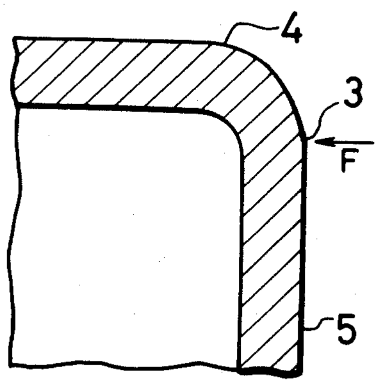

According to the arrangements as described above, in the cylindrical panel and the spherical panel, the mold match lines 23 are respectively formed as the curved lines which follow the boundary between the face portion 4 and the skirt portion 5 so that the distance between the mold match line 23 and the face portion 4 can be reduced over the entire periphery of the panel. As a result, when the above tension band 29 is wound around the mold match line 23, the tension F thereof becomes the state as shown in FIG. 5 over the entire periphery of the panel, thus the tension being transmitted to the face portion effectively. Accordingly, it is possible to increase the implosion protection of the cathode ray tube. Further, since even if the panel is small in thickness the cathode ray tube with the satisfactory implosion protection is provided, it is possible to decrease the manufacturing cost of the cathode ray tube.

Figure 2:
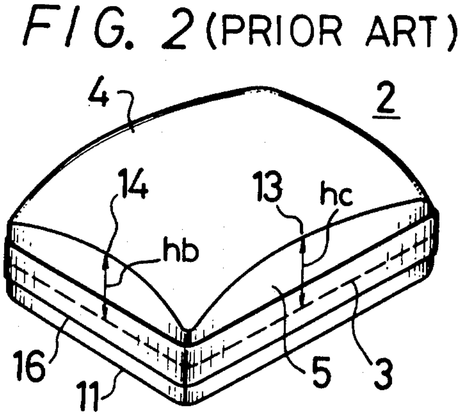
FIG. 2 (PRIOR ART)
Figure 3:
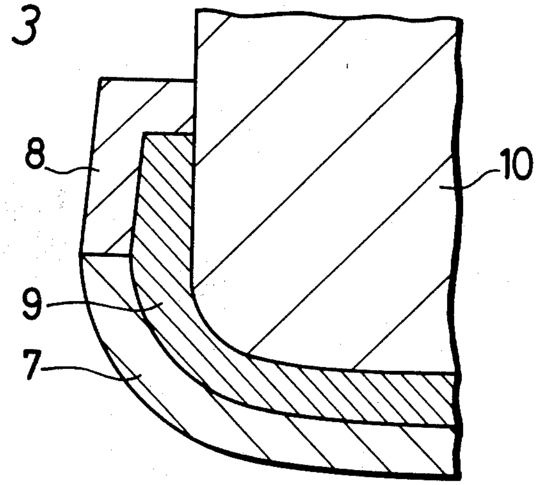
FIG. 3 is a cross-sectional view showing a method for manufacturing a panel.
Figure 4:
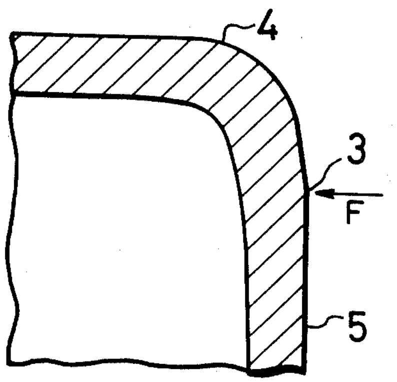
FIGS. 4 and 5 are cross-sectional views illustrating the way of how the tension by the tension band is applied to the face portion.
Figure 6:
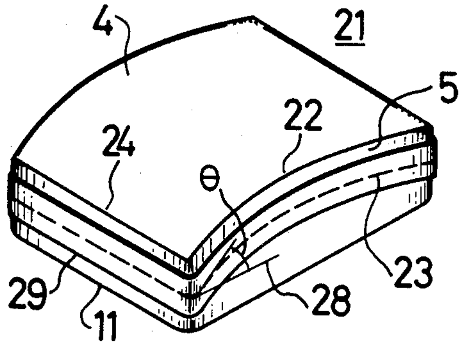
FIGS. 6 and 7 are respectively perspective views illustrating the states that the tension bands are wound around the panels of this invention.

Next, TABLE 1 indicates measured results of implosion protection strengths of the prior art panels shown in FIGS. 1 and 2 and the panels of the present invention shown in FIGS. 6 and 7 under the condition that the thickness of the central portion of the panel and the tension of the tension band are respectively changed.

TABLE 1

| | thickness (mm) of center portion of panel | tension (ton) of tension band | implosion protection strength |
|---|---|---|---|
| Prior art panel (1) | 13 | 2.3 | |
| Prior art panel (2) | 12 | 2.3 | Δ |
| panel of this invention (1) | 13 | 1.4 | |
| panel of this invention (2) | 12 | 1.4 | |

In the implosion protection strength on this table, a mark indicates good implosion protection strength and a mark Δ a poor one.

Figure 10:
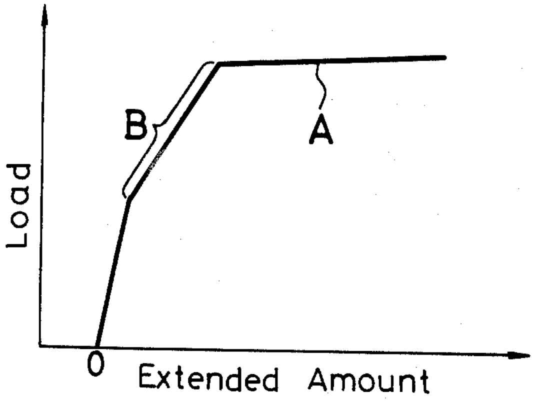
FIG. 10 is a graph indicating a relation between a load and an extended amount of the tension band of this invention.

Then, a curved line A of FIG. 10 indicates a measured result of a relation between an extended amount and a load with respect to the tension band of this invention. A range in which an effect can be achieved by using the tension band of this invention lies in a region B of the curved line A.

As set forth above, according to this invention, since the mold match line is provided so as to substantially follow the boundary between the face portion of the panel of the cathode ray tube and its skirt portion, the tension of the tension band wound around the mold match line can be effectively transmitted to the entire periphery of the face portion. Thus, the stress within the face plate against the external force is increased and hence the implosion protection strength of the panel can be increased.

What is claimed is:

1. A cathode ray tube including:
   - a front panel having a curved face portion,
   - a skirt portion joined to said face portion along a curved boundary, said panel having a curved mold match line substantially following the contour of said curved boundary, the distance between said mold match line and said boundary being substantially constant, and
   - a tension band providing impolsion protection for said tube and trained about said mold match line.

2. A cathode ray tube as claimed in claim 1 wherein:
   - said tension band is wound about said mold match line so as to substantially follow the curved boundary between said face portion and said skirt portion.

* * * * *